United States Patent
Nowozin et al.

(10) Patent No.: US 10,311,378 B2
(45) Date of Patent: *Jun. 4, 2019

(54) DEPTH FROM TIME-OF-FLIGHT USING MACHINE LEARNING

(71) Applicant: Microsoft Technology Licensing, LLC, Redmond, WA (US)

(72) Inventors: Sebastian Nowozin, Cambridge (GB); Amit Adam, Haifa (IL); Shai Mazor, Binyamina (IL); Omer Yair, Haifa (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/672,261

(22) Filed: Aug. 8, 2017

(65) Prior Publication Data
US 2018/0129973 A1 May 10, 2018

Related U.S. Application Data

(63) Continuation of application No. 15/068,632, filed on Mar. 13, 2016, now Pat. No. 9,760,837.

(51) Int. Cl.
*G06N 99/00* (2019.01)
*G06K 9/62* (2006.01)
(Continued)

(52) U.S. Cl.
CPC .......... *G06N 20/00* (2019.01); *G01S 7/4808* (2013.01); *G01S 17/89* (2013.01); *G06K 9/20* (2013.01); *G06K 9/6256* (2013.01); *G06T 7/50* (2017.01); *G06T 7/521* (2017.01); *G01S 17/36* (2013.01); *G01S 17/66* (2013.01)

(58) Field of Classification Search
CPC ......................... G06N 99/005; G06T 7/0057
See application file for complete search history.

(56) References Cited

U.S. PATENT DOCUMENTS 8,294,809 B2   10/2012   Stettner
8,405,680 B1   3/2013   Cardoso Lopes et al.
(Continued)

FOREIGN PATENT DOCUMENTS

JP   2013117958 A   6/2013
WO   2008152647 A2   12/2008
WO   2013120041 A1   8/2013

OTHER PUBLICATIONS

"Notice of Allowance Issued in U.S. Appl. No. 15/068,632", dated Apr. 19, 2017, 15 Pages.
(Continued)

*Primary Examiner* — David F Dunphy

(57) ABSTRACT

A depth detection apparatus is described which has a memory storing raw time-of-flight sensor data received from a time-of-flight sensor. The depth detection apparatus also has a trained machine learning component having been trained using training data pairs. A training data pair comprises at least one simulated raw time-of-flight sensor data value and a corresponding simulated ground truth depth value. The trained machine learning component is configured to compute in a single stage, for an item of the stored raw time-of-flight sensor data, a depth value of a surface depicted by the item, by pushing the item through the trained machine learning component.

20 Claims, 13 Drawing Sheets

(51) Int. Cl.
  G06K 9/20      (2006.01)
  G06T 7/50      (2017.01)
  G01S 17/89     (2006.01)
  G06N 20/00     (2019.01)
  G01S 7/48      (2006.01)
  G06T 7/521     (2017.01)
  G01S 17/36     (2006.01)
  G01S 17/66     (2006.01)

(56) References Cited

U.S. PATENT DOCUMENTS

| | | | |
|---|---|---|---|
| 8,670,029 | B2 | 3/2014 | McEldowney |
| 8,717,469 | B2 | 5/2014 | Felzenshtein et al. |
| 8,849,616 | B2 | 9/2014 | Mehta et al. |
| 9,213,883 | B2 | 12/2015 | Kim et al. |
| 9,836,538 | B2 | 12/2017 | Rappaport et al. |
| 2004/0101043 | A1 | 5/2004 | Flack et al. |
| 2006/0256112 | A1 | 11/2006 | Heirich et al. |
| 2010/0228743 | A1 | 9/2010 | Rappaport et al. |
| 2011/0025843 | A1 | 2/2011 | Oggier et al. |
| 2012/0033045 | A1 | 2/2012 | Schweizer et al. |
| 2012/0105587 | A1 | 5/2012 | Lee et al. |
| 2012/0154535 | A1 | 6/2012 | Yahav et al. |
| 2012/0185094 | A1 | 7/2012 | Rosenstein et al. |
| 2012/0212496 | A1 | 8/2012 | Kulla |
| 2014/0122381 | A1 | 5/2014 | Nowozin |
| 2014/0185921 | A1 | 7/2014 | Choi et al. |
| 2014/0340569 | A1 | 11/2014 | Raskar et al. |
| 2015/0015569 | A1 | 1/2015 | Jung et al. |
| 2015/0049347 | A1 | 2/2015 | Laffargue et al. |
| 2015/0071526 | A1 | 3/2015 | Nguyen et al. |
| 2015/0109414 | A1* | 4/2015 | Adam ................ G01C 11/02 348/46 |
| 2015/0193938 | A1 | 7/2015 | Freedman et al. |
| 2015/0221194 | A1 | 8/2015 | Sarkar |
| 2015/0235351 | A1 | 8/2015 | Mirbach et al. |
| 2015/0248764 | A1 | 9/2015 | Keskin et al. |
| 2016/0034810 | A1 | 2/2016 | Hershey et al. |
| 2016/0132768 | A1* | 5/2016 | Ray .................... G06N 3/08 706/22 |
| 2016/0314613 | A1 | 10/2016 | Nowozin et al. |
| 2017/0032222 | A1 | 2/2017 | Sharma et al. |

OTHER PUBLICATIONS

Adam, et al., "Bayesian Time-of-Flight for Realtime Shape, Illumination and Albedo", In IEEE Transactions on Pattern Analysis and Machine Intelligence, vol. 39, Issue 5, May 1, 2017, pp. 851-864.

Chan, et al., "A Noise-Aware Filter for Real-Time Depth Upsampling", In Proceedings in Workshop on Multi-Camera and Multi-Modal Sensor Fusion Algorithms and Applications-M2SFA2, Oct. 2008, 12 Pages.

Grzegorzek, et al., "Time-of-Flight and Depth Imaging: Sensors, Algorithms and Applications", In Book-the Time-of-Flight and Depth Imaging: Sensors, Algorithms and Applications, Jan. 1, 2013, 10 Pages.

Haykin, et al., "Neural Networks and Learning Machines", In Book of the Neural Networks and Learning Machines, Jan. 1, 2009, pp. 201-202.

Jlang, et al., "Spatio-Temporal Segmentation with Depth-Inferred Videos of Static Scenes", In Technical Report of State Key Lab of CAD&CG, Zhejiang University, Sep. 2010, pp. 1-19.

Meister, et al., "Photon Mapping based Simulation of Multi-Path Reflection Artifacts in Time-of-Flight Sensors", In IEEE Conference on Computer Vision and Pattern Recognition, Jun. 23, 2013, pp. 1-7.

Mutny, et al., "Learning the Correction for Multi-Math Deviations in Time-of-Fiight Cameras", In Journal arXiv preprint arXiv:1512.04077, Jan. 12, 2016, 7 Pages.

Park, et al., "High Quality Depth Map Upsampling for 3D-TOF Cameras", In Proceedings of the International Conference on Computer Vision, Nov. 6, 2011, pp. 1623-1630.

"International Search Report and Written Opinion Issued in PCT Application No. PCT/US17/020846", dated Jun. 19, 2017, 26 Pages.

Zanuttigh, et al., "Time-of-Flight and Structured Light Depth Cameras: Technology and Applications", In Book-The Time-of-Flight and Structured Light Depth Cameras: Technology and Applications, Jan. 1, 2016, pp. 83-107.

Zhu, et al., "Spatial-Temporal Fusion for High Accuracy Depth Maps using Dynamic MRFs", In IEEE Transactions on Pattern Analysis and Machine Intelligence, vol. 32, Issue 5, May 2010, pp. 1-10.

Jakob, Wenzel, "Mitsuba-Physically Based Renderer", Retrieved From: <<https://www.mitsuba-renderer.org/>>, 2014, 2 Pages.

"Final Office Action Issued in U.S. Appl. No. 14/692,527", dated Dec. 6, 2017, 7 Pages.

"Non-Final Office Action Issued in U.S. Appl. No. 14/692,527", dated Apr. 27, 2017, 7 Pages.

Xiao, et al., "Shadow Removal from Single RGB-D Images", In Proceedings of the IEEE Conference on Computer Vision and Pattern Recognition, Jun. 2014, pp. 3011-3018.

Veach, et al., "Metropolis Light Transport", In Proceedings of the 24th Annual Conference on Computer Graphics and Interactive Techniques, Aug. 3, 1997, pp. 65-76.

Adam, et al., "Bayesian Time-of-Flight for Realtime Shape, Illumination and Albedo", Retrieved from:<<http://de.arxiv.org/pdf/1507.06173>>, Jul. 22, 2015, 23 Pages.

Barron, et al., "Intrinsic Scene Properties from a Single RGB-D Image", In IEEE Conference on Computer Vision and Pattern Recognition, Jun. 2013, 8 Pages.

Barron, et al., "Shape, Albedo, and Illumination from a Single Image of an Unknown Object", In IEEE Conference on Computer Vision and Pattern Recognition, Jun. 2012, 8 Pages.

Barron, et al., "Shape, Illumination, and Reflectance from Shading", In Technical Report No. UCB/EECS-2013-117, May 29, 2013, 21 Pages.

Berger, James O, "Statistical Decision Theory and Bayesian Analysis", In Springer Science & Business Media, Aug. 21, 1985, pp. 1-12, 16-19, 60-64 and 82-88.

Breiman, et al., "Classification and Regression Trees", In Publication-Chapman and Hall/CRC, Jan. 1984, pp. 1-58, 216-265 and 297-317.

Bucilua, et al., "Model Compression", In Proceedings of the 12th ACM SIGKDD International Conference on Knowledge Discovery and Data Mining, Aug. 20, 2006, 7 Pages.

Criminisi, et al., "Decision Forests: A Unified Framework for Classification, Regression, Density Estimation, Manifold Learning and Semi-Supervised Learning", In Microsoft Research Technical Report TR-2011-114, Jan. 1, 2011, 151 Pages.

Dawid, A. Philip, "The Well-Calibrated Bayesian", In Journal of the American Statistical Association, vol. 77, Issue 379, Sep. 1982, 7 Pages.

Duffield, et al., "Priority Sampling for Estimation of Arbitrary Subset Sums", In Journal of the ACM, vol. 54, Issue 6, Dec. 2007, 37 Pages.

Finlayson, et al., "Removing Shadows from Images", In Proceedings of European Conference on Computer Vision, May 2002, 14 Pages.

Foi, et al., "Practical Poissonian-Gaussian Noise Modeling and Fitting for Single-Image Raw-Data", In IEEE Transactions on Image Processing, vol. 17, Issue 10, Oct. 2008, 18 Pages.

Fuchs, Stefan, "Multipath Interference Compensation in Time-of-Flight Camera Images", In Proceedings of 20th International Conference on Pattern Recognition, Aug. 23, 2010, pp. 3583-3586.

Gehler, et al., "Recovering Intrinsic Images with a Global Sparsity Prior on Reflectance", In Proceedings of Advances in Neural Information Processing Systems, Jan. 2011, 9 Pages.

Genz, et al., "Remarks on Algorithm 006: An Adaptive Algorithm for Numerical Integration over an N-dimensional Rectangular Region", In Journal of Computational and Applied Mathematics, vol. 6, Issue 4, Dec. 1980, pp. 295-302.

(56) References Cited

OTHER PUBLICATIONS

Green, Peter J., "Reversible Jump Markov Chain Monte Carlo Computation and Bayesian Model Determination", Biometrika, vol. 82, Issue 4, Dec. 1995, pp. 711-732.
Gupta, et al., "Phasor Imaging: A Generalization of Correlation-Based Time-of-Flight Imaging", In ACM Transactions on Graphics, vol. 34, Issue 5, Oct. 2015, 18 Pages.
Han, et al., "Enhanced Computer Vision with Microsoft Kinect Sensor: A Review", In IEEE Transactions on Cybernetics, Oct. 2013, 17 Pages.
Hansard, et al., "Time-of-Flight Cameras-Principles, Methods and Applications", In Springer Science & Business Media, Chapter 1-3, Nov. 2012, 63 Pages.
Haralick, Robert M., "Propagating Covariance in Computer Vision", In International Journal of Pattern Recognition and Artificial Intelligence, vol. 10, Issue 5, Aug. 1996, 17 Pages.
Healey, et al., "Radiometric CCD Camera Calibration and Noise Estimation", In IEEE Transaction on Pattern Analysis and Machine Intelligence, vol. 16, Issue 3, Mar. 1994, pp. 267-276.
Isard, et al., "CONDENSATION—Conditional Density Propagation for Visual Tracking", In International Journal of Computer Vision, vol. 29, Issue 1, Aug. 1998, pp. 5-28.
Izadi, et al., "KinectFusion: Real-Time 3D Reconstruction and Interaction using a Moving Depth Camera", In Proceedings of the 24th Annual ACM Symposium on User Interface Software and Technology, Oct. 16, 2011, pp. 559-568.
Jimenez, et al., "Modelling and Correction of Multipath Interference Time of Flight Cameras", In IEEE Conference on Computer Vision and Pattern Recognition, Jun. 16, 2012, pp. 893-900.
Kirkpatrick, Scott, "Optimization by Simulated Annealing: Quantitative Studies", In Journal of Statistical Physics, vol. 220, Issue 4598, May 1983, 2 pages.
Kirmani, et al., "SPUMIC: Simultaneous Phase Unwrapping and Multipath Interference Cancellation in Time-of-Flight Cameras Using Spectral Methods", In Proceedings of IEEE International Conference on Multimedia and Expo, Jul. 15, 2013, 6 Pages.
Kong, Augustine, "A Note on Importance Sampling Using Standardized Weights", In Technical Report-348, University of Chicago, Department of Statistics, Jul. 1992, 4 Pages.
Lange, et al., "Solid-State Time-of-Flight Range Camera", In IEEE Journal of Quantum Electronics, vol. 37, Issue 3, Mar. 2001, pp. 390-397.
Lefloch, et al., "Technical Foundation and Calibration Methods for Time-of-Flight Cameras", In Time-of-Flight and Depth Imaging Sensors, Algorithms, and Applications, Sep. 2013, 20 Pages.
Liu, Jun S. "Metropolized Independent Sampling with Comparisons to Rejection Sampling and Importance Sampling", Statistics and Computing, vol. 6, Jun. 1996, pp. 113-119.
Liu, Jun S., "Monte Carlo Strategies in Scientific Computing", In Springer Science and Business Media, Mar. 20, 2002, 34 Pages.
Liu, et al. "On the Limited Memory BFGS Method for Large Scale Optimization", In Mathematical Programming, vol. 45, Issue 1-3, Dec. 1989, pp. 503-528.

Newcombe, et al., "KinectFusion: Real-time Dense Surface Mapping and Tracking", In Proceedings of 10th IEEE International Symposium on Mixed and Augmented Reality, Oct. 26, 2011, pp. 127-136.
Payne, et al., "Illumination Waveform Optimization for Time-of-Flight Range Imaging Cameras", In Proceedings of Videometrics, Range Imaging, and Applications, Jun. 2011, 13 Pages.
"International Preliminary Report on Patentability Issued in PCT Application No. PCT/US2016/026294", dated Jul. 20, 2017, 10 Pages.
"International Search Report & Written Opinion Issued in PCT Application No. PCT/US2016/026294", dated Jul. 1, 2016, 14 Pages.
"Second Written Opinion Issued in PCT Application No. PCT/US2016/026294", dated Apr. 7, 2017, 8 Pages.
Pharr, et al., "Physically Based Rendering: From Theory to Implementation", In Publication-by Morgan Kaufmann, Chapter 1.2, 5-8, 12,13.4, Jul. 14-17, 2010, pp. 4-15, 261-474, 606-633, 652-659, and 680-986.
Pitts, et al., "Time-of-Flight Tracer", In Microsoft Research MSR-TR-2014-142, Nov. 2014, 22 Pages.
Reynolds, et al., "Capturing Time-of-Flight Data with Confidence", In IEEE Conference on Computer Vision and Pattern Recognition, Jun. 20, 2011, pp. 945-952.
Robert, Christian, "The Bayesian Choice-From Decision-Theoretic Foundations to Computational Implementation", In Springer Science & Business Media, Aug. 27, 2007, 615 Pages.
Rubinstein, et al., "Simulation and the Monte Carlo Method", A John Wiley & Sons, Inc., Publication, Dec. 2007, 79 Pages.
Schwarte, et al., "A New Electro-Ooptical Mixing and Correlating Sensor: Facilities and Applications of the Photonic Mixer Device (PMD)", Proc. SPIE Sensors, Sensor Systems, and Sensor Data Processing, Sep. 1997, 9 Pages.
Shao, et al., "Computer Vision for RGB-D Sensors: Kinect and Its Applications", In IEEE Transaction on Cybernetics, vol. 43, Issue 5, Oct. 2013, pp. 1314-1317.
Shim, et al. "Recovering Translucent Objects using a Single Time-of-Flight Depth Camera", In IEEE Transaction on Circuits and Systems for Video Technology, Feb. 2015, 14 Pages.
Shotton, et al., "Efficient Human Pose Estimation from Single Depth Images", In Proceedings of IEEE Transactions on Pattern Analysis and Machine Intelligence, vol. 35, Issue 12, Jun. 21, 2011, 21 Pages.
Shotton, et al., "Real-Time Human Pose Recognition in Parts from Single Depth Images", In Proceedings of IEEE Conference on Computer Vision and Pattern Recognition, Jun. 20, 2011, 8 Pages.
Tadmor, et al., "A Fast Global Shutter Image Sensor Based on the VOD Mechanism", In Journal of IEEE Sensors, Nov. 2, 2014, 4 Pages.
Thrun, et al., "Probabilistic Robotics", The MIT Press, Chapter 9, Sep. 2005, 56 Pages.
Trefethen, Lloyd N., "Approximation Theory and Approximation Practice", In SIAM International Conference on Data Mining, Jun. 2011, 121 Pages.

* cited by examiner

DEPTH FROM TIME-OF-FLIGHT USING MACHINE LEARNING

CROSS-REFERENCE TO RELATED APPLICATION

This application is a continuation of and claims priority to U.S. application Ser. No. 15/068,632, entitled "DEPTH FROM TIME-OF-FLIGHT USING MACHINE LEARNING," filed Mar. 13, 2016, which is incorporated herein in its entirety.

BACKGROUND

Time-of-flight (TOF) cameras are increasingly used in a variety of applications, for example, human computer interaction, automotive applications, measurement applications and machine vision. A TOF camera can be used to compute depth maps which contain information relating to the depth of an object in a scene from the camera. The depth refers to the projection of distance on an imaginary line that extends from the camera, where the distance is the absolute radial distance. A light source at the TOF camera illuminates the scene and the light is reflected by objects in the scene. The camera receives the reflected light that, dependent on the distance of an object to the camera, experiences a delay. Given the fact that the speed of light is known, a depth map is computable.

However, the time of flight measurement is subject to a number of errors and uncertainties which lead to errors in the computed depth maps. For example, the reflected light often undergoes multiple reflections from different surfaces within the scene which cause significant errors in the calculated depth.

The embodiments described below are not limited to implementations which solve any or all of the disadvantages of known TOF cameras or TOF data processing systems.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A depth detection apparatus is described which has a memory storing raw time-of-flight sensor data received from a time-of-flight sensor. The depth detection apparatus also has a trained machine learning component having been trained using training data pairs. A training data pair comprises at least one simulated raw time-of-flight sensor data value and a corresponding simulated ground truth depth value. The trained machine learning component is configured to compute in a single stage, for an item of the stored raw time-of-flight sensor data, a depth value of a surface depicted by the item, by pushing the item through the trained machine learning component.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
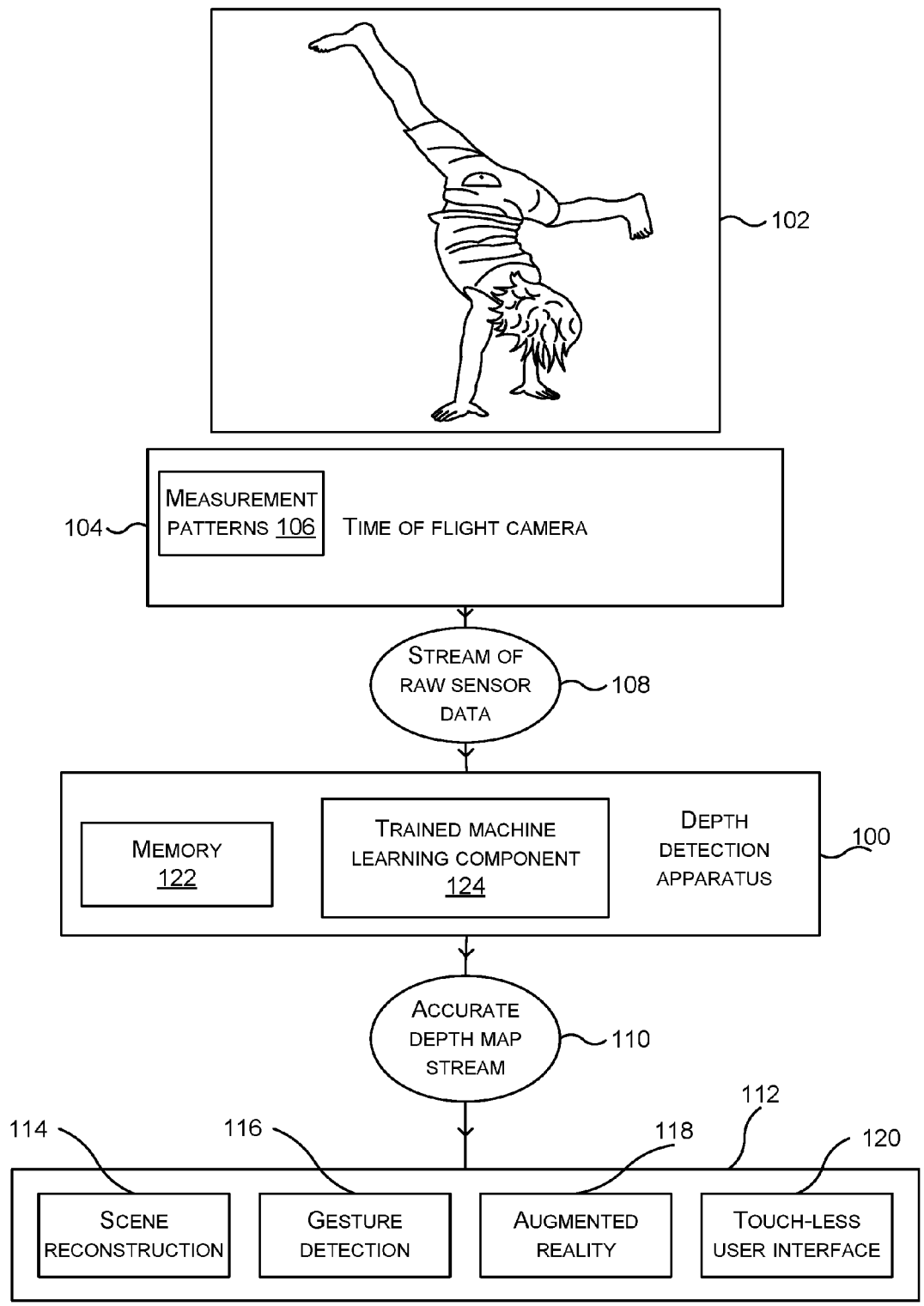
FIG. 1 is a schematic diagram of a trained machine learning component deployed with a time-of-flight camera.

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

Time-of-flight cameras output raw sensor data which is then processed to derive depth values. The act of processing the raw sensor data to compute the depth values is time consuming and complex. In addition, the depth values which are computed suffer from inaccuracy due to multi-path interference and noise in the raw sensor data. However, time-of-flight cameras are increasingly used for real time applications and/or where highly accurate depth values are needed. For example, hand tracking, body tracking, 3D scene reconstruction and others.

By using a trained machine learning system as described herein, it is possible to directly derive highly accurate depth values from raw time-of-flight sensor data in real time. This is achieved in a single stage, without the need to compute depth values using conventional, non-machine learning methods. The trained machine learning system takes raw time-of-flight sensor data as input and computes depth values as output, where the depth values already take into account multi-path interference and optionally also take into account sensor noise. This improves the speed with which the depth values are computed, since there is a single stage.

For example, there is no need to compute the depth values and then subsequently process the depth values to correct for multi-path interference and/or sensor noise. The result gives a better computing device which is able to control a downstream system using accurate depth values obtained from one or more time-of-flight sensors. Usability from the point of view of the end user is improved since the accurate depth values give a better correspondence with reality such as for hand tracking, body tracking, augmented reality and others.

The machine learning system has been trained using pairs of simulated raw time-of-flight sensor data frames and corresponding depth maps. The simulated raw time-of-flight sensor data frames are calculated using a modified computer graphics renderer as described in more detail below. The simulated raw time-of-flight sensor data frames are simulated assuming that multi-path interference occurs. Therefore it is possible to learn a mapping from simulated raw time-of-flight sensor data direct to depth values which are already corrected for multi-path interference. There is no need to apply a subsequent stage to correct the depth values for multi-path interference. As a result processing is significantly simplified and speeded up. Because the processing is simpler than two stage processes, the processing is implementable at a dedicated chip, field programmable gate array (FPGA) or similar. This is particularly useful where the processing is to be carried out at a time-of-flight camera itself, or on a resource constrained device such as a wearable or mobile computing device which has an integral time-of-flight camera.

The machine learning component described herein is found to give highly accurate depth values, especially for situations where depth values are difficult to compute accurately using existing approaches. For example, at corners of rooms, where the floor meets the wall, where the wall meets the ceiling, in the case of highly reflective surfaces such as shiny floors, and others. Accuracy improvements are believed to be due, at least in part, to the fact that the machine learning component has been trained with the particular type of training data.

FIG. 1 is a schematic diagram of a depth detection apparatus 100 comprising a memory 122 and a trained machine learning component 124. A time-of-flight camera 104, which is a phase modulation time-of-flight depth camera or a gated time-of-flight depth camera (or another future type of TOF camera), captures a stream of raw sensor data 108 depicting a scene 102. One or more objects in the scene 102 and/or the time-of-flight camera itself are moving in some examples. For example, in the scenario of FIG. 1 the scene comprises a child doing a cartwheel so that there are several moving objects in the scene (the child's limbs). The time-of-flight camera is wall-mounted in the room or in some examples is body worn or head-mounted or mounted on a robot or vehicle.

The stream of raw sensor data 108 comprises a plurality of frames of raw sensor data which have been captured by the time-of-flight camera. For example, for some types of time-of-flight camera a frame of raw sensor data comprises, for each pixel of the camera sensor, complex numbers which are amplitude and phase measurements of reflected light. For example, for another type of time-of-flight camera, a frame of raw sensor data comprises, for each pixel of the camera sensor, a plurality of intensity values of reflected light sensed at the pixel, for different exposure periods.

The time-of-flight camera uses one or more measurement patterns 106 also referred to as exposure profiles. A measurement pattern is a set of values of configurable parameters of the time-of-flight camera, to be used when a frame of raw sensor data is captured by the camera. Where different measurement patterns 106 are available, the time-of-flight camera is able to capture different frames using different measurement patterns.

The stream of raw sensor data 108 is input to a depth detection apparatus 100 comprising a memory 122 and a trained machine learning component 124. The trained machine learning component 124 computes depth maps, or depth values of individual pixels, in a single stage process which takes into account multi-path interference and/or sensor noise so that an accurate depth map stream 110 is output. A depth map comprises a plurality of depth values, each depth value being for an individual pixel of the time of flight image sensor. In some examples, depth values of individual pixels are output. In some examples the trained machine learning component 100 also outputs uncertainty data associated with the depth values. The stream 110 of depth values and optional uncertainty data is input to a downstream system 112 such as a scene reconstruction engine 114, a gesture detection system 116, an augmented reality system 118, a touch-less user interface 120 or others.

The depth detection apparatus 100 operates in real-time in some examples. In some cases the depth detection apparatus 100 is integral with the time-of-flight camera 104. In some cases the depth detection apparatus 100 is in a computing device such as a smart phone, tablet computer, head worn augmented reality computing device, or other computing device which has a time-of-flight camera. The memory 122 holds raw time-of-flight sensor data from the stream 108 and makes this available to the trained machine learning component 124 for processing. The trained machine learning component 124 has been trained using pairs of simulated raw time-of-flight sensor data frames and corresponding depth maps. The simulated raw time-of-flight sensor data frames are simulated assuming that multi-path interference occurs. In some examples the trained machine learning component 124 has been trained using pairs of raw time-of-flight sensor data values associated with individual sensor pixels and corresponding depth values.

In some examples, the trained machine learning component 124 comprises a trained regressor such as a random decision forest, directed acyclic graph, support vector machine, neural network, or other trained regressor. The trained regressor is a pixel independent trained regressor in some examples, in that it is trained using pairs comprising individual pixels and associated individual depth values, and where dependencies between the pairs are not taken into account. In other examples, the trained regressor does take dependencies between individual pixels into account. An example, of a trained regressor which does take dependencies between individual pixels into account is a convolutional neural network. An example in which the trained regressor is a pixel independent regressor is a random decision forest which is given below with reference to FIGS. 8 to 10. An example in which the trained regressor is a convolutional neural network taking into account dependencies between pixels is given with respect to FIGS. 11 to 12 below.

Figure 2:
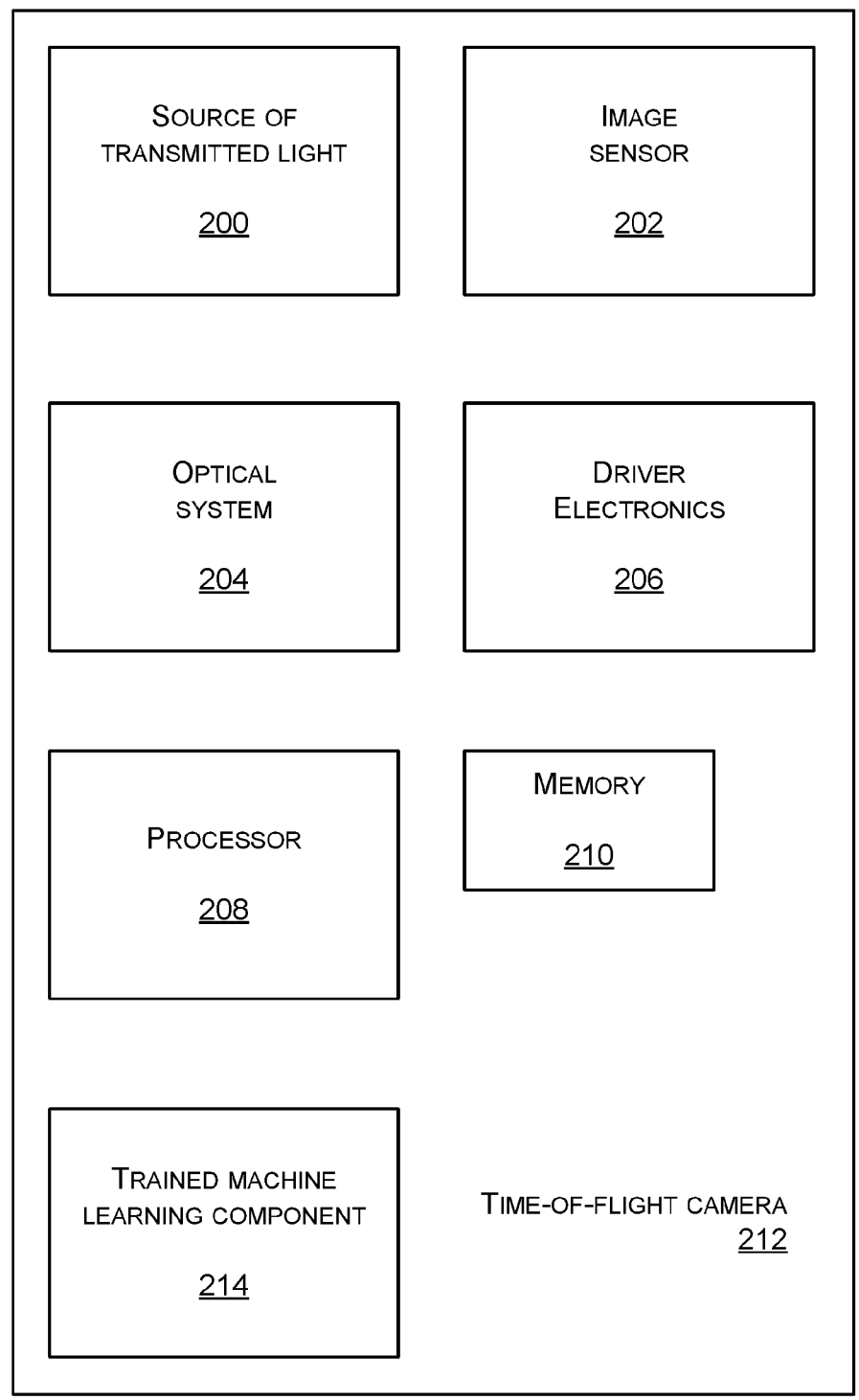
FIG. 2 is a schematic diagram of a time-of-flight camera.

FIG. 2 is a schematic diagram of a time-of-flight depth camera 200 which is a phase modulation time-of-flight depth camera or a gated time of flight depth camera or any other future type of time-of-flight depth camera. The time-of-flight camera 200 comprises a source of transmitted light 202. In an example the source of transmitted light is an incoherent light source. In another example the source of transmitted light is a coherent light source. An example of an appropriate light source is a near infra-red laser or light emitting diode (LED) however another appropriate light source may be used. In the case of a phase modulated time of flight camera the transmitted light is modulated at a modulation frequency. In an example the modulation frequency may be a radio frequency (RF) frequency in the range kHz-GHz (kilo hertz to giga hertz), for example the modulation frequency may be in the MHz (mega hertz) range. In the case of a gated time-of-flight camera the transmitted light is pulsed where the pulses may be of picosecond to nanosecond duration.

A time-of-flight depth camera comprises an image sensor 204 that receives light reflected from objects within the scene. The image sensor 204 comprises a charge-coupled device (CCD) sensor, a complementary metal-oxide-semiconductor (CMOS) sensor, for example a Photonic Mixer Device (PMD) sensor or other appropriate sensor which is arranged to detect light reflected from objects, people and surfaces within the camera range. In the case of a gated time-of-flight camera the image sensor 204 has a resolution compatible with the duration of the pulses emitted by the light source.

The camera comprises an optical system 206 that is arranged to gather and focus reflected light from the environment on to the image sensor 204. In an example the optical system comprises an optical band pass filter, which allows only light of the same wavelength as the light source to be received by the sensor. The use of an optical band pass filter helps to suppress background light. The camera comprises driver electronics 208 which control both the light source and an image sensor, for example, to enable highly accurate phase difference measurements to be made or to enable a train of light pulses to be emitted and for the image sensor to be "shuttered" on and off. An image sensor may be shuttered on and off electronically rather than with physical shutters.

In one example the camera comprises a processor 208 and a memory 210 which stores raw time-of-flight data, depth maps and other data. A trained machine learning component 214 is available at the camera 212 in some examples and in other examples this trained machine learning component is at another computing device which receives and processes the raw sensor data from the camera. Where the trained machine learning component 214 is at the camera 212 it comprises software stored at memory 210 and executed at processor 208 in some cases. In some examples the trained machine learning component 214 is an FPGA or a dedicated chip. For example, the functionality of the trained machine learning component 214 is implemented, in whole or in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 3:
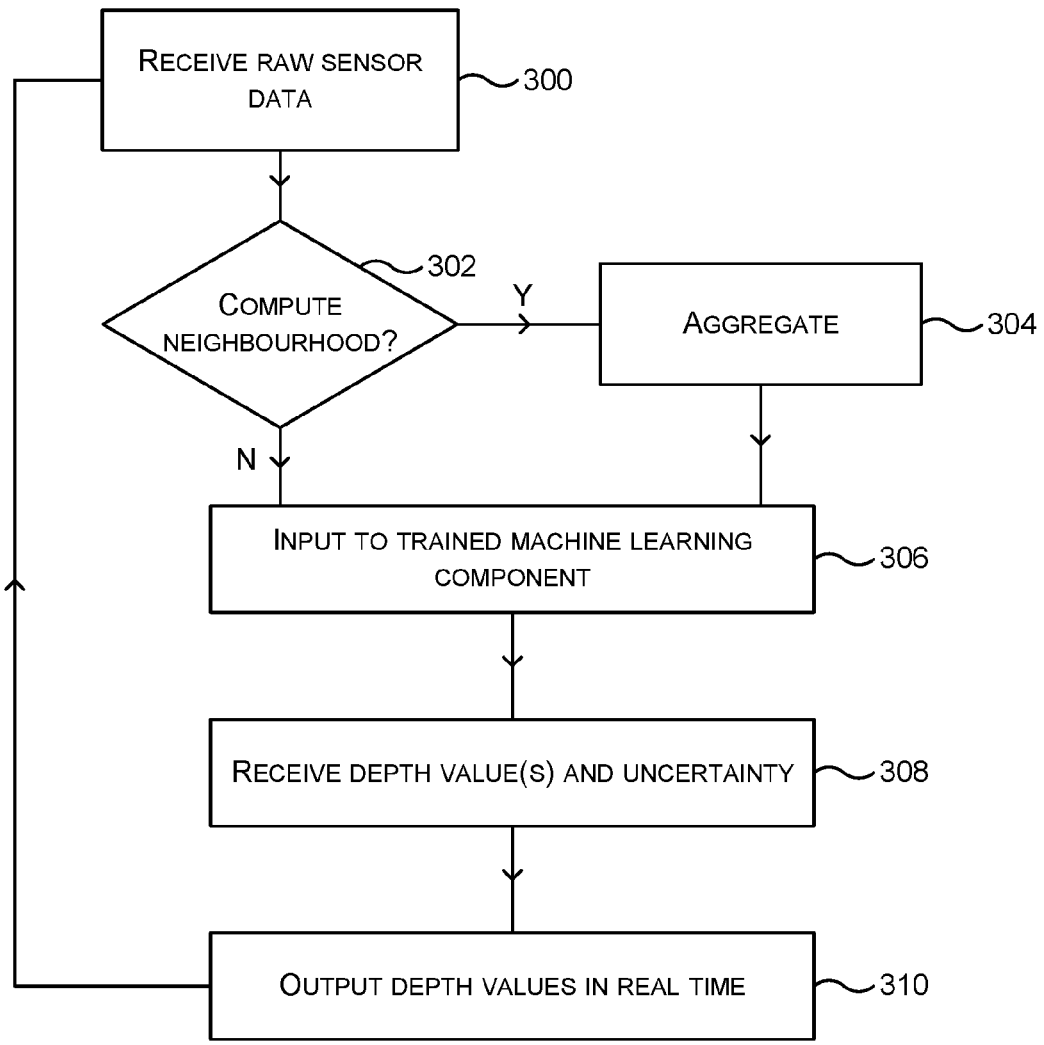
FIG. 3 is a flow diagram of a method of using a trained machine learning component such as that of FIG. 1.
Figure 10:
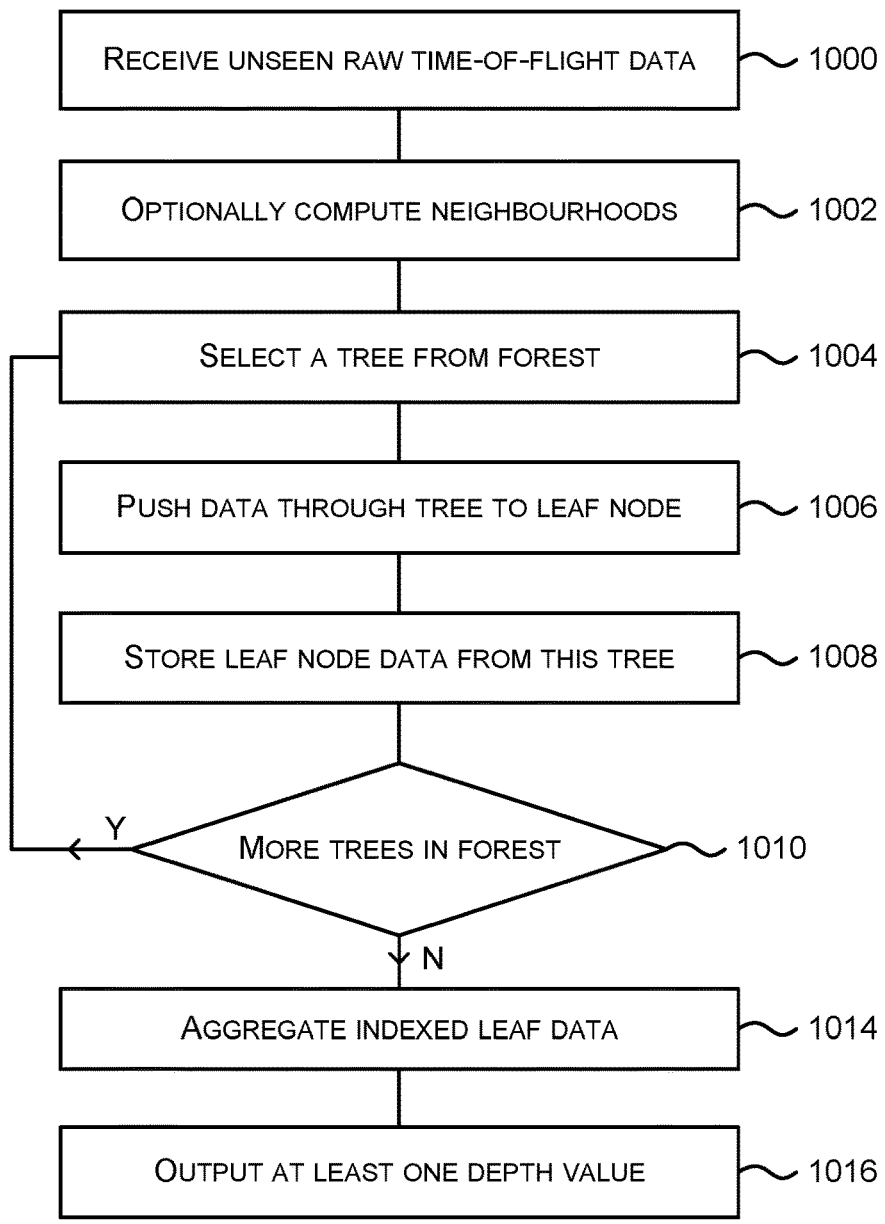
FIG. 10 is a flow diagram of a method of using a trained random decision forest at test time, such as the trained machine learning component of FIG. 1.
Figure 12:
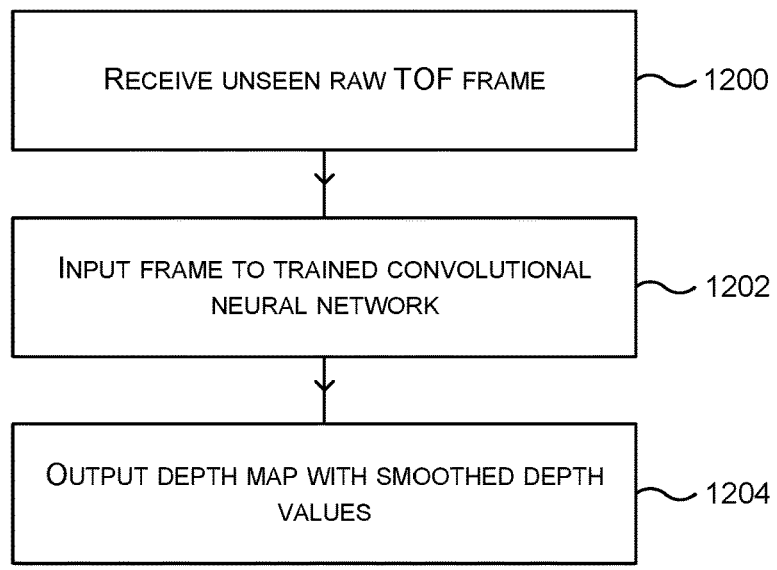
FIG. 12 is a flow diagram of using a trained convolutional neural network.

The trained machine learning component 214 is arranged to execute the methods described herein with respect to FIGS. 3, 10, 12 in order to compute depth in real time, using a single stage, from a stream of raw time-of-flight data in a manner which allows for multi-path interference. This is achieved without the need to compute corrections to the depth values and apply those subsequent to the depth values having been computed.

FIG. 3 is a flow diagram of a method at the depth detection apparatus 100. Raw sensor data is received from the time-of-flight camera 104 and stored at memory 122. A check 302 is made as to whether the process is to compute neighborhoods or not. The decision is made according to user input, or settings configured by an operator during manufacturing. In some examples, the depth detection apparatus automatically decides whether neighborhoods are to be computed according to the nature of the captured sensor data or other sensor data, such as sensors which detect motion of the time-of-flight camera.

In the case that neighborhoods are not computed the depth detection apparatus inputs 306 the raw sensor data 300 to the trained machine learning component. The input process comprises inputting raw sensor data associated with individual pixels and/or whole frames of raw sensor data. As a result, the depth detection apparatus receives 308, from the trained machine learning component depth value(s) and optionally also uncertainty data. The depth detection apparatus outputs the depth values in real time 310 together with the uncertainty data in some cases. By real time, it is meant that the rate of the received raw sensor data 300 is at least matched by the output rate of the output depth values at operation 310. The process of FIG. 3 repeats as more raw sensor data is received 300.

In the case that neighborhoods are computed the depth detection apparatus aggregates 304 raw sensor data values of pixels in a neighborhood of the pixel under current consideration. The neighborhood is either a spatial neighborhood or a temporal neighborhood or a combination of a spatial and temporal neighborhood.

The aggregated raw sensor data values are input to the trained machine learning component at operation 306. In this case the trained machine learning component has been trained using training data which has been aggregated in the same manner. In the case that temporal neighborhoods are used, the training data allows for motion between the camera and the scene. For example, as a result of objects in the scene moving and/or as a result of the camera moving. This is achieved by using a model of motion between the camera and the scene.

The machine learning system outputs depth values associated with the neighborhoods at operation 308 and the process proceeds with operation 310 and returns to operation 300 as described above.

The table below has empirical data demonstrating how the depth detection apparatus 100 of FIG. 1 has improved accuracy as compared with an alternative method using a probabilistic generative model of time-of-flight on which inference is possible. To obtain the data for the table below and the graph of FIG. 4, the alternative method used the same conditions, such as number of exposures per frame, as the present method. The results for the alternative method are in the column labeled "generative" in the table below. A probabilistic generative model of time-of-flight is a description, expressed using likelihoods, of how raw time-of-flight data is generated by a time-of-flight camera under specified imaging conditions comprising reflectivity of a surface generating reflected light received at the camera (also referred to as albedo), illumination of the surface, and depth of the surface from the camera. Inference is possible on the probabilistic generative model so that given known imaging conditions it is possible to infer corresponding raw sensor data and vice versa. The probabilistic generative model takes into account a single path for reflected light for each pixel. In the alternative approach raw time-of-flight sensor data is used to compute depth values from the probabilistic generative model, or from an approximation of the probabilistic generative model.

It can be seen from the table below that the present approach has a slightly lower median error but that the biggest improvement is with respect to the largest errors. There is a 44% reduction in the number of depth value errors where the depth error is more than 5 centimeters.

|  | Generative approach | Approach of FIG. 1 |
|---|---|---|
| Median error in millimeters | 17 | 16 |
| 90% quantile error in millimeters | 96 | 63 |
| % reduction of errors above 50 millimeters | baseline | 44 |

Figure 4:
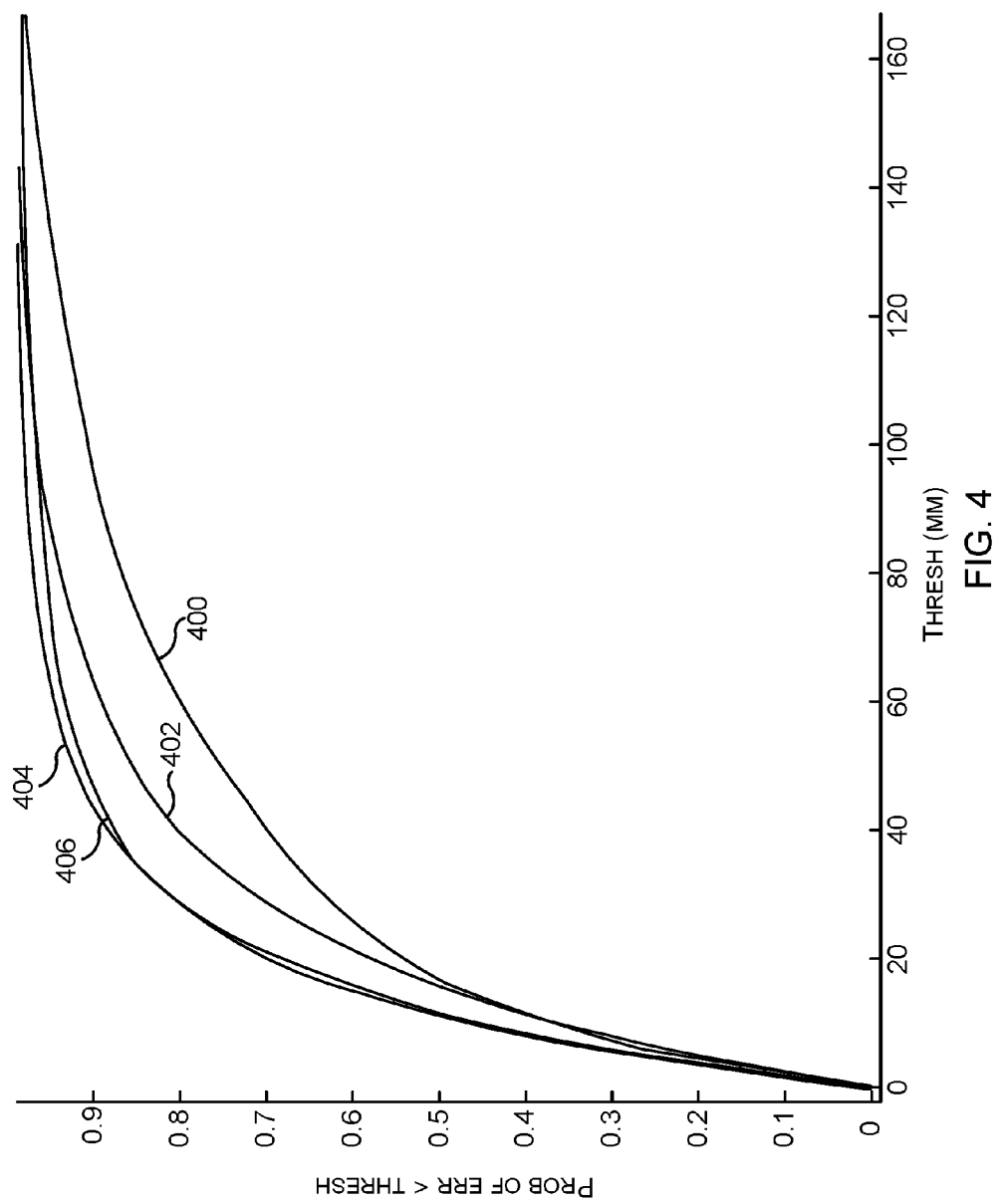
FIG. 4 is a graph of empirical results of depth values computed using the arrangement of FIG. 1 and various other arrangements.

FIG. 4 is a cumulative distribution plot of the empirical data of the above table and additional empirical data. The graph of FIG. 4 plots the probability of the depth error being less than a threshold, against the size of the threshold in millimeters. Line 400 indicates the data for the approach using a generative model described above and lines 402, 404, 406 indicate data for the present approach using either four exposures per frame (line 402), six exposures per frame (line 406) or eight exposures per frame (line 404) of the time-of-flight camera. It is seen that the generative approach gives the worst performance.

Figure 5:
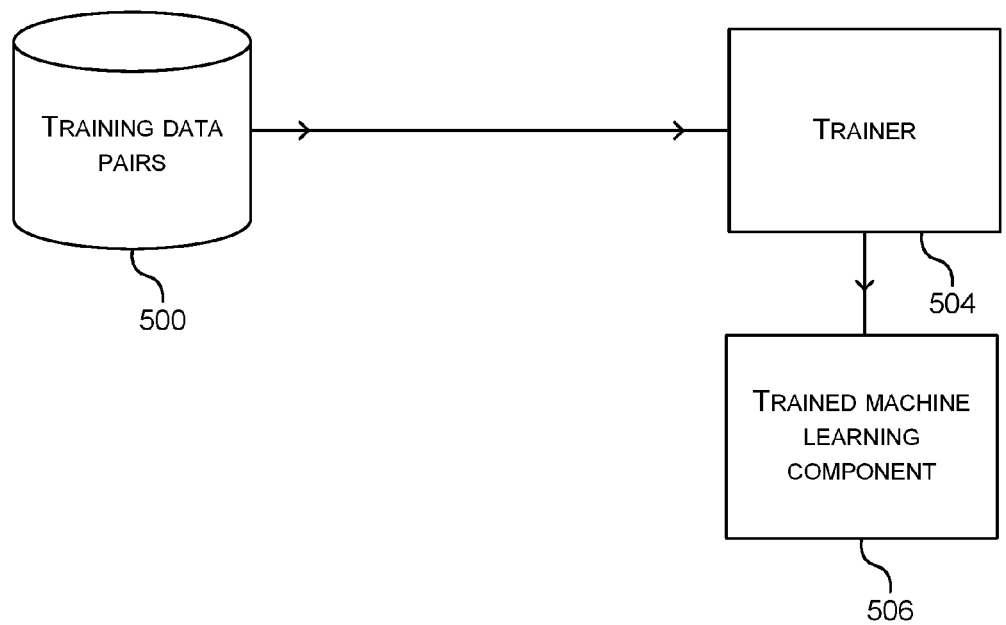
FIG. 5 is a schematic diagram of components used to create a trained machine learning component, such as that of FIG. 1.

FIG. 5 is a schematic diagram of how to create a trained machine learning component such as component 124 of FIG. 1. Millions of training data pairs (or more) are stored at a database 500 or other store. In some examples, a training data pair comprises a simulated raw time-of-flight sensor data frame and a corresponding ground truth depth map. In some examples a training data pair comprises a plurality of raw sensor data values associated with a pixel of the sensor, and a ground truth depth value associated with the pixel. In some examples a training data pair comprises a plurality of aggregated raw sensor data values, aggregated over a spatial or temporal neighborhood around a pixel of the sensor, and a ground truth depth value associated with the pixel. The raw sensor data values are obtained from a time-of-flight simulator which simulates multi-path interference as part of the simulation. The time-of-flight simulator comprises a renderer 606 and a viewpoint selector 604 and an example is described in more detail with reference to FIG. 6. The time-of-flight simulator is relatively complex and it is not possible to carry out inference on the time-of-flight simulator as it is for the generative model of time-of-flight mentioned above.

A trainer 504 accesses the training data pairs 500 and uses them to train and produce a trained machine learning component 506 such as a random decision forest, a convolutional neural network, a support vector machine or other trained regressor. The resulting trained machine learning component 506 may then be used as described above with respect to FIGS. 1 and 3. The type of training data used to train the machine learning component corresponds with the type of data input to the machine learning component at test time. Test time is the time in which the machine learning component is operational to compute depth values from previously unseen raw sensor data. By using a wide variety of training data examples performance of the trained machine learning system is improved both in terms of accuracy and in terms of ability to generalize to examples which are different from the training examples. However, it is difficult to obtain appropriate training data. Ways in which good variety of training data are obtained are now described with reference to FIG. 6.

Figure 6:
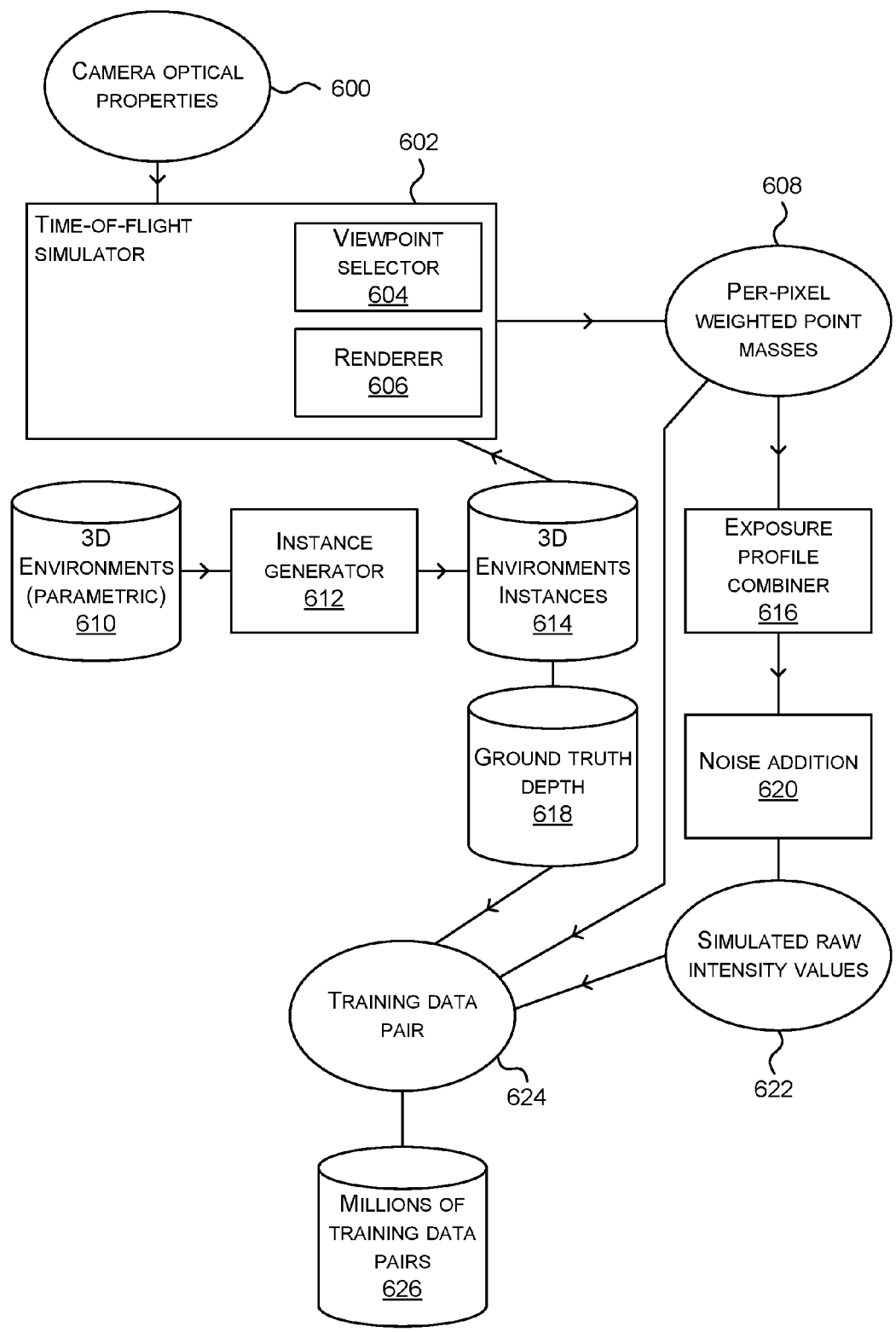
FIG. 6 is a schematic diagram of components used to generate training data pairs such as the training data pairs of FIG. 5.

FIG. 6 is a schematic diagram of a time-of-flight simulator 602 and other components used to create training data pairs 626 such as the training data pairs described above with reference to FIG. 5.

Figure 7:
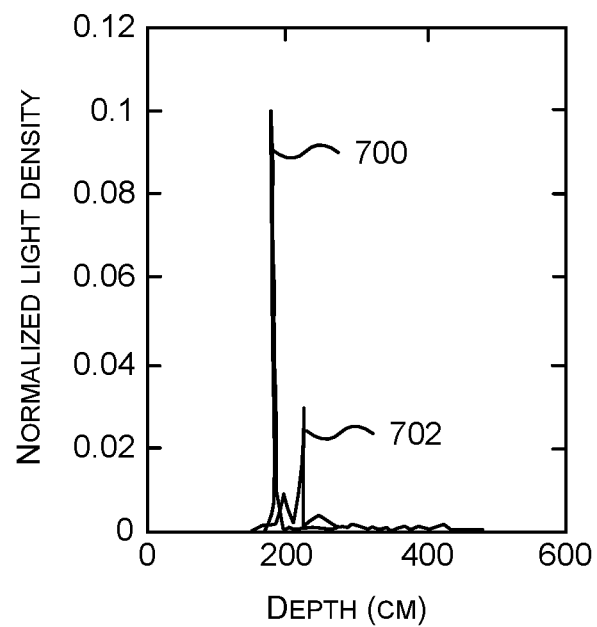
FIG. 7 is a graph of data output by a time-of-flight simulator such as that of FIG. 6.

The time-of-flight simulator 602 comprises a renderer 606 such as a computer graphics renderer which uses ray-tracing to render an image from a model of a 3D object or environment. The renderer 606 is a physically-accurate renderer which produces realistic rendered images by using physical modeling of light scattering, light transport simulation, and integration of paths of light at every pixel. The renderer 606 records, for each pixel, an intensity weight and a path length (the length of the path of simulated light from the simulated emitter of the TOF camera to the simulated surface(s) in the world and back to the simulated TOF sensor) for each of a plurality N of light path samples. The number of light path samples is the same for each pixel and is fixed in advance in some cases, such as a few thousand light path samples. In other examples, the number of light path samples is selected adaptively during simulation, for example, so that more complex areas in the scene are allocated more simulated light paths compared to simpler areas. More complex areas are identified in various ways such as according to the presence of corners, the presence of edges, the degree of surface reflectivity, or other factors. This gives per-pixel weighted point masses 608. An example of a per-pixel weighted point mass is given in FIG. 7 for a pixel depicting a surface in a corner of a room. The pixel in the example of FIG. 7 receives light from multiple paths due to multi-path interference and so there are multiple peaks 700, 702 of the normalized light density. The first peak of the per-pixel weighted point mass gives an estimate of the ground truth depth which is input to the training data pair 624 in some examples.

As mentioned above the renderer 606 uses ray-tracing to render an image from a model of a 3D object or environment. It is time consuming and expensive to generate suitable models of 3D objects or environments. For example, where the time-of-flight camera is to be used indoors, the models are of typical indoor environments such as living rooms, offices, kitchens and other indoor environments. However, it is difficult to obtain a good range and variety of models of such 3D environments. In order to address this, the present technology uses a plurality of parametric 3D environment models 610. A parametric 3D environment model 610 is a computer manipulable description of a 3D environment expressed using one or more parameters. An instance generator 612 accesses a parametric 3D environment model from a store of parametric 3D environment models 610 and creates a plurality of instances. An instance is a 3D environment model created from a parametric 3D environment model by selecting values of the parameters of the parametric 3D environment model. The instances are created by selecting values of the parameters at random and/or within a specified range of possible values of the parameters according to knowledge of feasible parameter value ranges. A non-exhaustive list of examples of parameters of a parametric 3D environment model is: geometry of individual objects in the 3D model, presence or absence of individual objects (including light sources), object location, object orientation, surface materials and textures, amount of ambient illumination. Using parametric models in this way enables a huge number of variations of 3D environment model to be generated in a fast, efficient manner. For example, in the case of a parametric 3D model of a living room, values of parameters can be adjusted to vary surface reflectivity of the flooring material, ceiling, walls, furniture, and also to vary geometry and/or position of objects in the room such as furniture, light fittings, windows other objects. As a result of the wide range and large number of 3D environment model instances the time-of-flight simulator 602 is able to render good variety of simulated raw time-of-flight data which incorporates multi-path interference. This gives improved quality training data pairs 626 and as a consequence, the trained machine learning component gives better quality depth values and uncertainty information. As a result there is a depth detection apparatus giving highly accurate depth values enabling better control by downstream computing systems.

The renderer 606 renders an image from a model of a 3D object or environment given a camera viewpoint. A camera viewpoint is a 3D position and orientation within a bounding box of the 3D environment model instance. The renderer 606 uses details of optical properties 600 of the time-of-flight camera such as the field of view of the camera, the focal length, and the spatial light emission intensity profile. The time-of-flight simulator has a viewpoint selector 604 which selects a large number of possible viewpoints of the camera within the instance of the 3D environment model. For example, the viewpoint selector 604 selects the viewpoints at random by choosing random 3D positions and orientations within a bounding box of the 3D environment model. The viewpoint selector 604 is arranged to reject viewpoints which are within a threshold distance of objects in the 3D environment model. For example, to reject viewpoints which face a wall of the 3D environment with only 20 centimeters between the camera viewpoint and the wall. For a given 3D environment model instance, the renderer computes simulated raw time-of-flight data for each of a plurality of viewpoints selected by the viewpoint selector 604. For example, thousands of different viewpoints. As a result the training data pairs 624 exhibit good variety and the resulting trained machine learning component 124 is able to generalize well to unseen 3D environments with unseen camera viewpoints.

As mentioned above, the time-of-flight simulator 602 outputs per-pixel weighted point masses 608. These do not take into account exposure profiles a time-of-flight camera has. This means that the time-of-flight simulator can be used for any type of time-of-flight camera. The per-pixel weighted point masses 608 are input to an exposure profile combiner 616 which incorporates information about a specified exposure profile of a time-of-flight camera into the raw time-of-flight data being simulated. The exposure profile is specified, by an operator during manufacturing, by selecting the exposure profile from a library of exposure profile details, or using user input. For example, the exposure profile is described using vector constant A and vector-valued function C. A vector-valued function is a function which takes a scalar argument and returns a vector. In an example, the exposure profile combiner 616 combines the per-pixel weighted point masses (values of weight w and path length t) with the vector constants A and the vector-valued function C using the following equation:

$$\vec{\mu} = \tau\vec{A} + \sum_{i=1}^{N} \frac{\omega_i}{d(t_i)}\vec{C}(t_i)$$

Where N is the number of light path samples fixed at a value such as a few thousand samples and where the symbol z denotes the ambient light intensity used by the time-of-flight simulator. The values of the vector constant A and the values of the elements returned by the vector-valued function C in some examples are between zero and $2^{12}$.

The above equation is expressed in words as a mean response vector $\vec{\mu}$ of simulated raw time-of-flight sensor intensity values (such as four intensity values one for each of four exposures) simulated as being observed at the same pixel of the sensor, is equal to the ambient light intensity $\tau$ times a vector constant $\vec{A}$ which represents part of the exposure pattern of the time of flight camera, plus the sum over the number of light path samples N, of a vector-valued function $\vec{C}$ evaluated at $t_i$, which represents another part of the exposure pattern of the time-of-flight camera times the weight $\omega_i$ which is the point mass weight from the time-of-flight simulator output for the light path sample i, and taking into account a distance decay function $d(t_i)$ where intensity falls away with distance from the camera of the surface which reflects the light.

In some examples, sensor noise is simulated. That is, the output of the exposure profile combiner is processed by a noise addition component 620 which adds noise to the simulated raw time-of-flight data. However it is not essential to use the noise addition component 620.

The output of the noise addition component 620 is simulated raw intensity values 622 associated with a pixel, and which incorporate multi-path interference and sensor noise. This data is formed into a training data pair 624 by accessing the corresponding ground truth depth value (which is the true depth of the surface depicted by the pixel). The corresponding ground truth depth value is known either by computing it from the 3D environment instance 614 or by taking the first peak of the per-pixel weighted point mass. Given a 3D environment model instance the depth detection apparatus computes ground truth depth values 318 for a given camera viewpoint.

The process described above for computing a training data pair is repeated to obtain millions of training data pairs 626 which are stored. In some cases a training data pair comprises a frame of simulated raw time-of-flight sensor data and a corresponding ground truth depth map. This is achieved by repeating the process for individual pixels of the sensor to form a frame.

In some examples, the machine learning system comprises a random decision forest. A random decision forest comprises one or more decision trees each having a root node, a plurality of split nodes and a plurality of leaf nodes. Raw TOF sensor data is pushed through trees of a random decision forest from the root to a leaf node in a process whereby a decision is made at each split node. The decision is made according to values of parameters at the split nodes, where the values of the parameters have been learnt during training. At a split node the raw TOF sensor data proceeds to the next level of the tree down a branch chosen according to the results of the decision.

During training, parameter values (which specify decision criteria to be used at the split nodes) are learnt for use at the split nodes and data (Raw TOF sensor data with ground truth depth values) is accumulated at the leaf nodes. The training data accumulated at a leaf node during training is stored as a histogram, or in an aggregated manner, such as using a mean, median or mode or by fitting a probability distribution to the histogram and storing statistics describing the probability distribution.

At test time previously unseen raw TOF sensor data is input to the system to have one or more depth values predicted. This is described with reference to FIG. 10.

Figure 8:
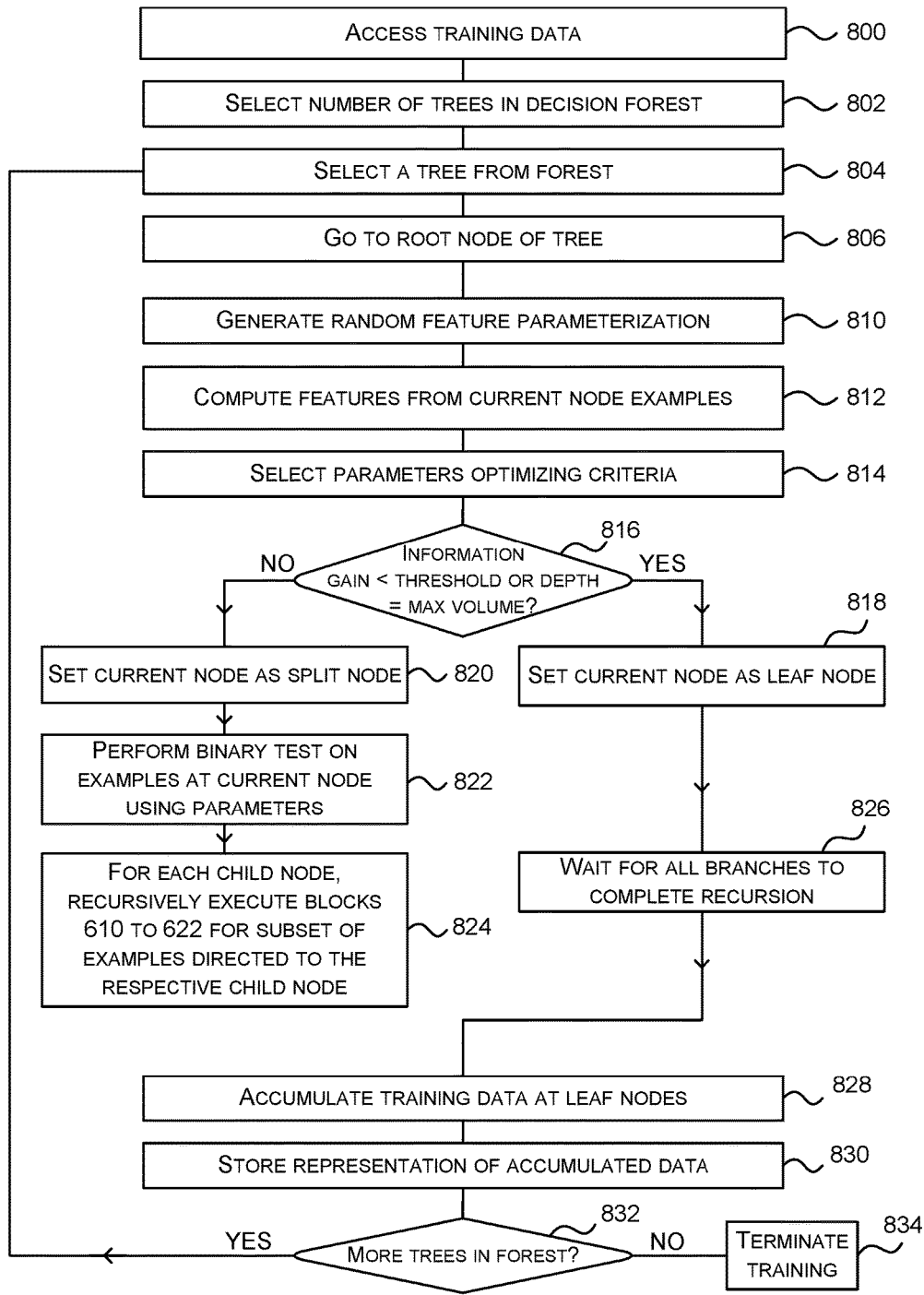
FIG. 8 is a flow diagram of a method of training a random decision forest using training data pairs such as those of FIG. 6.

Referring to FIG. 8, to train the decision trees, the training set described above is first received 800. The number of decision trees to be used in a random decision forest is selected 802. A random decision forest is a collection of deterministic decision trees. Decision trees can be used in classification or regression algorithms, but can suffer from over-fitting, i.e. poor generalization. However, an ensemble of many randomly trained decision trees (a random forest) yields improved generalization. During the training process, the number of trees is fixed.

Figure 9:
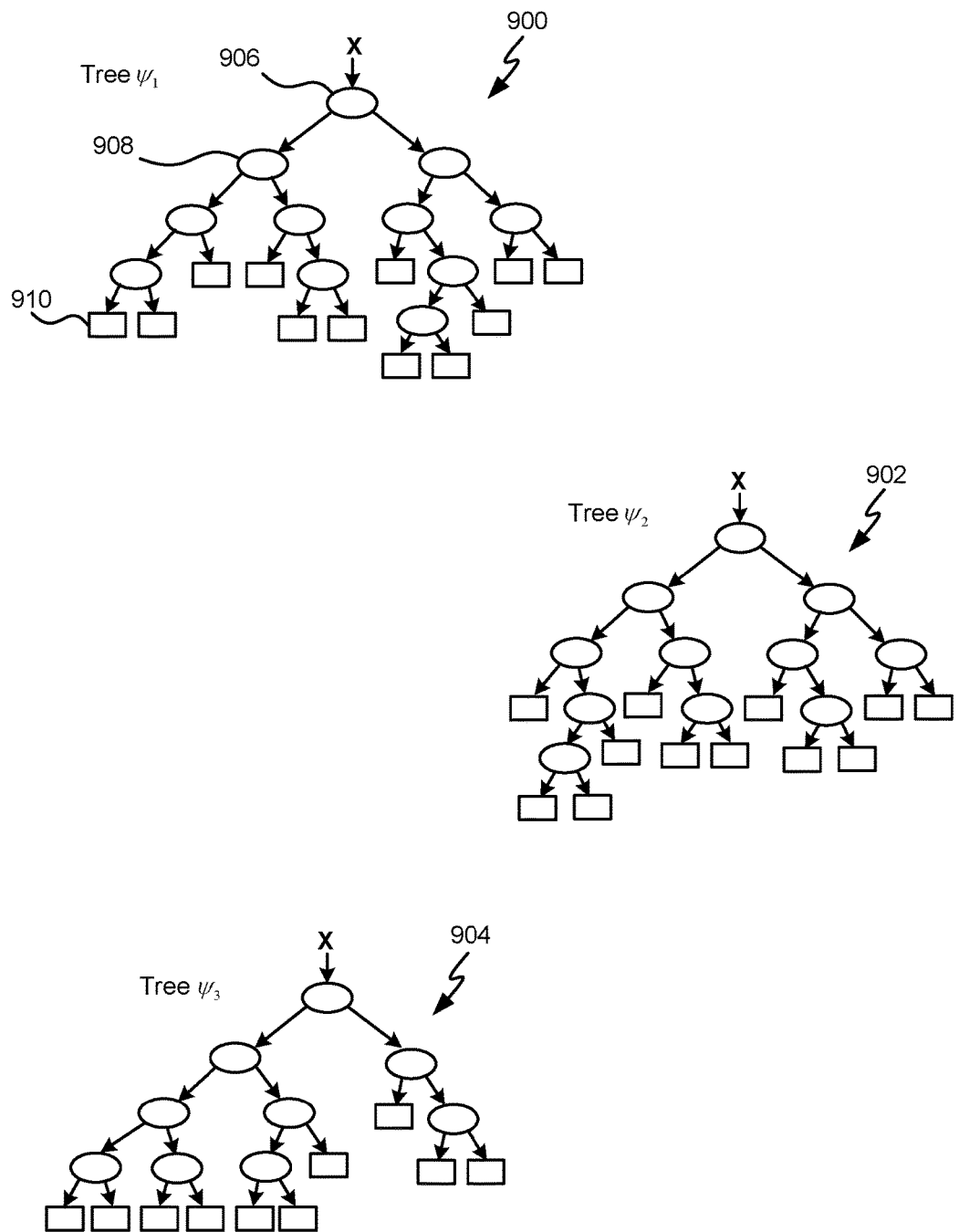
FIG. 9 is a schematic diagram of a plurality of random decision trees.

An example random decision forest is shown illustrated in FIG. 9. The illustrative decision forest of FIG. 9 comprises three decision trees: a first tree 900; a second tree 902; and a third tree 904. Each decision tree comprises a root node (e.g. root node 906 of the first decision tree 900), a plurality of internal nodes, called split nodes (e.g. split node 908 of the first decision tree 900), and a plurality of leaf nodes (e.g. leaf node 910 of the first decision tree 900).

A decision tree from the decision forest is selected 804 (e.g. the first decision tree 800) and the root node 806 is selected. A random set of test parameter values are then generated 810 for use by a binary test performed at the root node. The parameters are thresholds or other parameters of a binary test. In the case that neighborhoods of pixels are used then the binary test optionally comprises pairwise tests comparing pairs of pixels. In the pixel-independent case pairwise tests are not essential.

Then, every combination of test parameter value is applied 812 to each raw TOF training data item which has reached the current node. For each combination, criteria (also referred to as objectives) are calculated 814. In an example, the calculated criteria comprise the information gain (also known as the relative entropy). The combination of parameters that optimize the criteria (such as maximizing the information gain is selected 814 and stored at the current node for future use. As an alternative to information gain, other criteria can be used, such as the residual variance criterion or others.

It is then determined 816 whether the value for the calculated criteria is less than (or greater than) a threshold. If the value for the calculated criteria is less than the threshold, then this indicates that further expansion of the tree does not provide significant benefit. This gives rise to asymmetrical trees which naturally stop growing when no further nodes are beneficial. In such cases, the current node is set 818 as a leaf node. Similarly, the current depth of the tree is determined (i.e. how many levels of nodes are between the root node and the current node). If this is greater than a predefined maximum value, then the current node is set 818 as a leaf node. Each leaf node has labeled raw TOF data which accumulate at that leaf node during the training process as described below.

It is also possible to use another stopping criterion in combination with those already mentioned. For example, to assess the number of raw TOF data items that reach the node. If there are too few examples (compared with a threshold for example) then the process is arranged to stop to avoid overfitting. However, it is not essential to use this stopping criterion.

If the value for the calculated criteria is greater than or equal to the threshold, and the tree depth is less than the maximum value, then the current node is set 820 as a split node. As the current node is a split node, it has child nodes, and the process then moves to training these child nodes.

Each child node is trained using a subset of the training time-of-flight data at the current node. The subset of training time-of-flight data sent to a child node is determined using the parameters that optimized the criteria. These parameters are used in the binary test, and the binary test performed 822 on all training time-of-flight data at the current node. The raw TOF data items that pass the binary test form a first subset sent to a first child node, and the raw TOF data items that fail the binary test form a second subset sent to a second child node.

For each of the child nodes, the process as outlined in blocks 810 to 822 of FIG. 8 are recursively executed 824 for the subset of raw TOF data items directed to the respective child node. In other words, for each child node, new random test parameters are generated 810, applied 812 to the respective subset of raw TOF data items, parameters optimizing the criteria selected 814, and the type of node (split or leaf) determined 816. If it is a leaf node, then the current branch of recursion ceases. If it is a split node, binary tests are performed 822 to determine further subsets of raw TOF data items and another branch of recursion starts. Therefore, this process recursively moves through the tree, training each node until leaf nodes are reached at each branch. As leaf nodes are reached, the process waits 826 until the nodes in all branches have been trained. Note that, in other examples, the same functionality can be attained using alternative techniques to recursion.

Once all the nodes in the tree have been trained to determine the parameters for the binary test optimizing the criteria at each split node, and leaf nodes have been selected to terminate each branch, then raw TOF data items with ground truth depth values are accumulated 828 at the leaf nodes of the tree. A representation of the accumulated depth values is stored 830 using various different methods.

Once the accumulated depth values have been stored it is determined 832 whether more trees are present in the decision forest. If so, then the next tree in the decision forest is selected, and the process repeats. If all the trees in the forest have been trained, and no others remain, then the training process is complete and the process terminates 834.

Therefore, as a result of the training process, one or more decision trees are trained using synthetic raw TOF data. Each tree comprises a plurality of split nodes storing optimized test parameters, and leaf nodes storing associated ground truth depth values. Due to the random generation of parameters from a limited subset used at each node, the trees of the forest are distinct (i.e. different) from each other.

The training process is performed in advance of using the trained machine learning system to compute depth values of observed raw TOF data. The decision forest and the optimized test parameters is stored on a storage device for use in computing depth values at a later time.

FIG. 10 illustrates a flowchart of a process for predicting depth values from previously unseen raw TOF data using a decision forest that has been trained as described above. Firstly, an unseen raw TOF data item is received 1000. A raw TOF data item is referred to as 'unseen' to distinguish it from a training TOF data item which has the depth value specified.

Optionally neighborhoods are computed 1002 from the unseen raw TOF data. The neighborhoods are spatial and/or temporal neighborhoods as described above.

A trained decision tree from the decision forest is selected 1004. The selected raw TOF data item (whole frame, values for an individual pixel, values for a neighborhood) is pushed 1006 through the selected decision tree such that it is tested against the trained parameters values at a node, and then passed to the appropriate child in dependence on the outcome of the test, and the process repeated until the raw TOF data item reaches a leaf node. Once the raw TOF data item reaches a leaf node, the accumulated depth values associated with this leaf node are stored 1008 for this raw TOF data item.

If it is determined 1010 that there are more decision trees in the forest, then a new decision tree is selected 1004, the raw TOF data item pushed 1006 through the tree and the accumulated depth values stored 1008. This is repeated until it has been performed for all the decision trees in the forest. Note that the process for pushing a raw TOF data item through the plurality of trees in the decision forest can also be performed in parallel, instead of in sequence as shown in FIG. 10.

The data from the indexed leaf nodes is aggregated 1014 by averaging or in other ways. For example, where histograms of depth values are stored at the leaf nodes the histograms from the indexed leaf nodes are combined and used to identify one or more depth values associated with the raw TOF data item. The processes outputs 816 at least one depth value as a result, and is able to output a confidence weighting of the depth value. This helps any subsequent algorithm assess whether the proposal is good or not. More than one depth value may be output; for example, where there is uncertainty.

The random decision forest example described above is modified in some cases by implementing the random decision forest as a directed acyclic graph in order to reduce the number of nodes of the graph. This facilitates deployment of the machine learning component on resource constrained devices such as smart phones, tablet computers and wearable computing devices.

Figure 11:
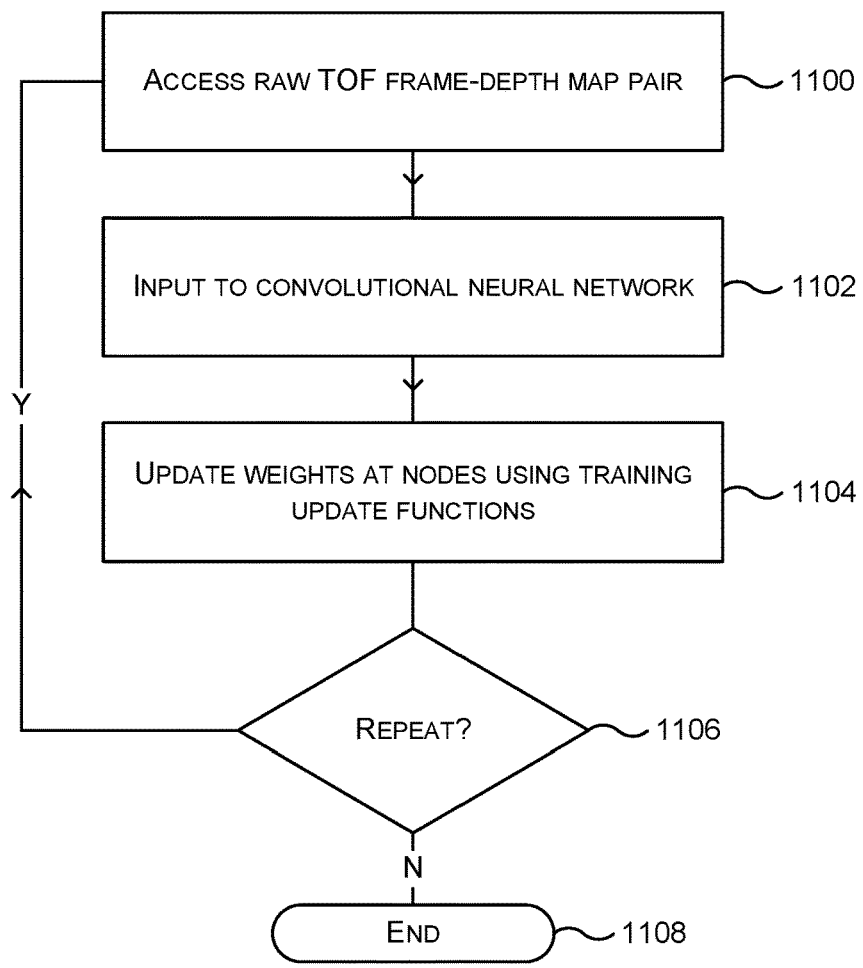
FIG. 11 is a flow diagram of a method of training a convolutional neural network using training data pairs such as those of FIG. 6.

FIG. 11 is a flow diagram of a method of training a convolutional neural network. In this case a training data pair comprises a raw TOF frame and a corresponding depth map. Individual pixel locations of the TOF frame have one or more intensity values, for different exposures for example. The training data pair is accessed 1100 and input to the convolutional neural network 1102.

A neural network is a plurality of weighted nodes which are interconnected by edges which may also be weighted. The neural network has input nodes, output nodes and internal nodes. In the present examples the output nodes are associated with depth values learnt during a training phase.

A convolutional neural network is a neural network where the nodes are arranged in multiple layers so that there are nodes in three dimensions, width, height and depth. Within each layer there are multiple receptive fields where a receptive field is a group of interconnected nodes which processes a portion of an input image (or TOF frame in the present examples). Within a layer the receptive fields are arranged so that their outputs partially overlap one another to give redundancy. A node of an internal layer is connected to neurons of one receptive field in the layer above. A convolutional neural network is typically a feed-forward neural network in which an input image (or TOF frame) is fed into input nodes, processed forwards through the network according to weights at the nodes, weighted connections between the nodes, and non-linear activation functions, and reaching a set of one or more output nodes.

During training the training data instance is fed forwards through the network, from the input nodes to the output nodes, with computations performed at the nodes which update 1104 the weights of the nodes and edges according to update rules. The update process is repeated for more training instances according to a check for convergence at check point 1106 of FIG. 11, such as to see if the amount of change from the most recent update was smaller than a threshold. When convergence is reached the training ends 1108.

During test time, when the trained convolutional neural network is used to predict depth maps from raw time-of-flight data frames, the trained machine learning component 124 receives 1200 an unseen raw time-of-flight frame. It inputs 1202 the frame to the trained convolutional neural network. Values associated with individual pixel locations (or neighborhoods) of the frame are input to the plurality of input nodes and this triggers a feed forward process through the network. The values from the frame pass through a layer of the neural network and trigger input to subsequent layers via the overlapping receptive fields. Eventually output nodes are triggered and depth values associated with the triggered output nodes are retrieved from storage. The depth values are then stored as a depth map 1204 optionally with uncertainty data calculated from the neural network outputs. The depth map has smoothed depth values because the receptive fields of the convolutional neural network enable spatial relationships between the pixel locations to be taken into account.

Figure 13:
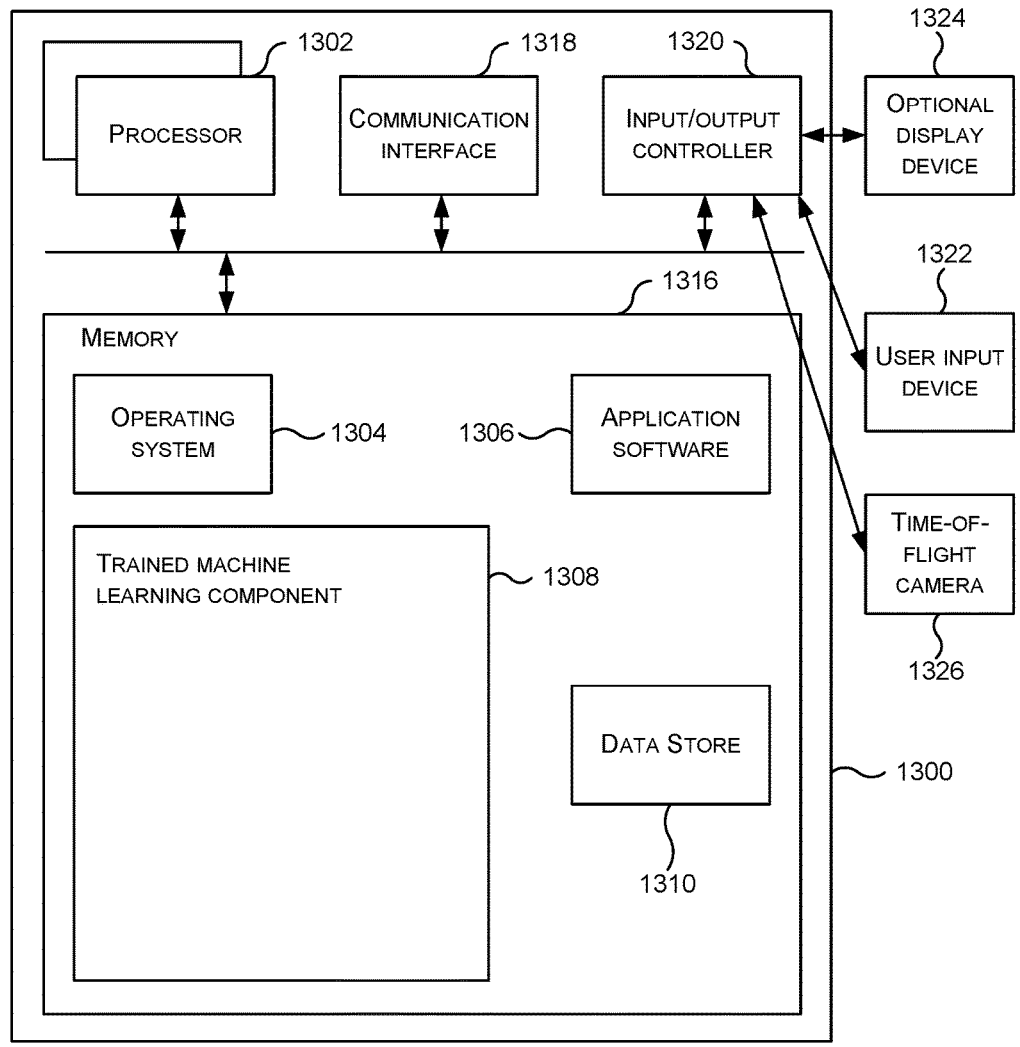
FIG. 13 illustrates an exemplary computing-based device in which embodiments of a trained machine learning component for use with a time-of-flight camera are implemented.

FIG. 13 illustrates various components of an exemplary computing-based device 1300 which is implemented as any form of a computing and/or electronic device, and in which embodiments of a depth detection apparatus is implemented in cases where the depth detection apparatus is separate from the time-of-flight camera. A non-exhaustive list of examples of forms of the computing and/or electronic device is: augmented reality near eye computing system, augmented reality body worn computing system, augmented reality wearable computing device, smart phone, desk top computer, computer game console, touch-less user interface computing device, tablet computer, laptop computer.

Computing-based device 1300 comprises one or more processors 1302 which are microprocessors, controllers or any other suitable type of processors for processing computer executable instructions to control the operation of the device in order to compute depth values or depth maps from raw time-of-flight data. In some examples, the computing-based device computes a stream of depth maps from a stream of frames of raw time-of-flight data (received from time-of-flight camera 1326) in real time and in a manner which takes into account multipath interference. In some examples, for example where a system on a chip architecture is used, the processors 1302 include one or more fixed function blocks (also referred to as accelerators) which implement a part of the method of any of FIG. 3, 5, 6, 8, 10, 11, 12 in hardware (rather than software or firmware). Platform software comprising an operating system 1304 or any other suitable platform software is provided at the computing-based device to enable application software 1006 to be executed on the device. A trained machine learning component 1308 is provided such as the trained machine learning component 124 of FIG. 1.

A data store 1310 at memory 1316 stores raw time-of-flight data, simulated raw time-of-flight data, parameter values, exposure profile data, 3D environment models and other data.

The computer executable instructions are provided using any computer-readable media that is accessible by computing based device 1300. Computer-readable media includes, for example, computer storage media such as memory 1316 and communications media. Computer storage media, such as memory 1316, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 1316) is shown within the computing-based device 1300 it will be appreciated that the storage is, in some examples, distributed or located remotely and accessed via a network or other communication link (e.g. using communication interface 1318).

The computing-based device 1300 also comprises an input/output controller 1320 arranged to output display information to a display device 1324, where used, which is separate from or integral to the computing-based device 1300. The display information optionally graphically presents depth maps computed by the computing-based device. The input/output controller 1320 is also arranged to receive and process input from one or more devices, such as time-of-flight camera 1326, a user input device 1322 (e.g. a stylus, mouse, keyboard, camera, microphone or other sensor). In some examples the user input device 1322 detects voice input, user gestures or other user actions and provides a natural user interface (NUI). This user input is used to specify 3D environment models, specify parameter values or for other purposes. In an embodiment the display device 1324 also acts as the user input device 1322 if it is a touch sensitive display device. The input/output controller 1320 outputs data to devices other than the display device in some examples, e.g. a locally connected printing device.

Any of the input/output controller 1320, display device 1324 and the user input device 1322 comprise, in some examples, NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Alternatively or in addition to the other examples described herein, examples include any combination of the following:

A depth detection apparatus comprising:

a memory storing raw time-of-flight sensor data received from a time-of-flight sensor; and a trained machine learning component having been trained using training data pairs, a training data pair comprising at least one simulated raw time-of-flight sensor data value and a corresponding simulated ground truth depth value;

the trained machine learning component configured to compute in a single stage, for an item of the stored raw time-of-flight sensor data, a depth value of a surface depicted by the item, by pushing the item through the trained machine learning component.

The apparatus mentioned above, the trained machine learning component having been trained using simulated raw time-of-flight sensor data values which incorporate simulated multi-path interference.

The apparatus mentioned above, the trained machine learning component having been trained using simulated raw time-of-flight sensor data values computed using a computer graphics renderer which simulates multi-path interference.

The apparatus mentioned above, the trained machine learning component having been trained using simulated raw time-of-flight sensor data values comprising, for an individual pixel, weighted intensity values at different depths potentially depicted by the pixel.

The apparatus mentioned above, the trained machine learning component having been trained using simulated raw time-of-flight sensor data values where information about an exposure profile of the time-of-flight sensor is combined with the simulated raw time-of-flight sensor data values.

The apparatus mentioned above, the trained machine learning component having been trained using simulated raw time-of-flight sensor data values where information about sensor noise of the time-of-flight sensor is combined with the simulated raw time-of-flight sensor data values.

The apparatus mentioned above, the trained machine learning component having been trained using simulated raw time-of-flight sensor data values computed using a computer graphics renderer from a plurality of instances of a parametric 3D environment model, where the instances of the parametric 3D environment model are computer generated automatically at random.

The apparatus mentioned above, where parameters of the parametric 3D environment model comprise one or more of: geometry of an object in the 3D environment model, position of an object in the 3D environment model, presence of an object in the 3D environment model, orientation of an object in the 3D environment model, surface materials and reflectivity, ambient illumination.

The apparatus mentioned above, wherein a training data pair comprises a frame of simulated raw time-of-flight sensor data values and a corresponding simulated ground truth depth map.

The apparatus mentioned above, the trained machine learning component having been trained using simulated raw time-of-flight sensor data values computed using a computer graphics renderer for a plurality of randomly selected viewpoints of the time-of-flight sensor, and where any of the viewpoints which are within a threshold distance of a surface in a 3D environment model used by the computer graphics renderer are omitted.

The apparatus mentioned above, the trained machine learning component having been trained using simulated raw time-of-flight sensor data values aggregated over a neighborhood of a pixel, where the neighborhood is a spatial neighborhood, or a temporal neighborhood, or a spatial and temporal neighborhood.

The apparatus mentioned above, where the trained machine learning component is a pixel independent regressor.

The apparatus mentioned above, where the trained machine learning component is regressor which takes into account relationships between pixels of the stored time-of-flight sensor data.

The apparatus mentioned above, where the trained machine learning component is a convolutional neural network and where each training data pair comprises a frame of simulated raw time-of-flight sensor data and a ground truth depth map.

The apparatus mentioned above, where the trained machine learning component is at least partially implemented using hardware logic selected from any one or more of: a field-programmable gate array, an application-specific integrated circuit, an application-specific standard product, a system-on-a-chip, a complex programmable logic device, a graphics processing unit.

A depth detection apparatus comprising:

a memory storing frames of raw time-of-flight sensor data received from a time-of-flight sensor; and a trained machine learning component having been trained using training data pairs, a training data pair comprising a simulated raw time-of-flight sensor frame and a corresponding simulated ground truth depth map;

the trained machine learning component configured to compute in a single stage, for a frame of the stored raw time-of-flight sensor data, a depth map of surfaces depicted by the frame, by pushing the frame through the trained machine learning component.

The apparatus mentioned above, where the trained machine learning component is configured to operate in real time by computing the depth maps at a rate which is equivalent to or faster than a frame rate of the time-of-flight sensor.

The apparatus mentioned above, where the trained machine learning component comprises a convolutional neural network.

The apparatus mentioned above, where the trained machine learning component comprises a pixel independent regressor which is a regressor that does not take into account relationships between pixels of a time-of-flight sensor frame.

A computer-implemented method comprising:

storing, at a memory, raw time-of-flight sensor data received from a time-of-flight sensor; and operating a trained machine learning component having been trained using training data pairs, a training data pair comprising at least one simulated raw time-of-flight sensor data value and a corresponding simulated ground truth depth value;

wherein operating the trained machine learning component comprises computing, in a single stage, for an item of the stored raw time-of-flight sensor data, a depth value of a surface depicted by the item, by pushing the item through the trained machine learning component.

An apparatus comprising:

means for storing raw time-of-flight sensor data received from a time-of-flight sensor; and means for operating a trained machine learning component having been trained using training data pairs, a training data pair comprising at least one simulated raw time-of-flight sensor data value and a corresponding simulated ground truth depth value; wherein operating the trained machine learning component comprises computing, in a single stage, for an item of the stored raw time-of-flight sensor data, a depth value of a surface depicted by the item, by pushing the item through the trained machine learning component.

The examples illustrated and described herein as well as examples not specifically described herein but within the scope of aspects of the disclosure constitute exemplary means for storing raw time-of-flight sensor data, executing a trained machine learning system, computing depth values or computing depth maps. For example, the memory of FIG. 2 or 13 constitutes exemplary means for storing raw time-of-flight sensor data. For example, the processor of FIG. 2 or 13 constitutes exemplary means for operating a trained machine learning component.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program is embodied on a computer readable medium. Examples of tangible storage media include computer storage devices comprising computer-readable media such as disks, thumb drives, memory etc. and do not include propagated signals. The software is suitable for execution on a parallel processor or a serial processor such that the method operations are carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above relate to one embodiment or relate to several embodiments. The embodiments are not limited to those that solve any or all of the stated problems or those that have any or all of the stated benefits and advantages. It will further be understood that reference to 'an' item refers to one or more of those items.

The operations of the methods described herein are carried out in any suitable order, or simultaneously where appropriate. Additionally, individual blocks may be deleted from any of the methods without departing from the scope of the subject matter described herein. Aspects of any of the examples described above are combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A depth detection apparatus comprising:
a memory storing raw time-of-flight sensor data received from a time-of-flight sensor; and
a processor comprising a trained machine learning component having been trained using training data pairs, a training data pair comprising at least one simulated raw time-of-flight sensor data value and a corresponding simulated ground truth depth value;
the trained machine learning component configured to compute, in a single stage, for an item of the stored raw time-of-flight sensor data, a depth value of a surface depicted by the item by pushing the item through the trained machine learning component.

2. The apparatus of claim 1, the trained machine learning component having been trained using simulated raw time-of-flight sensor data values which incorporate simulated multi-path interference.

3. The apparatus of claim 1 the trained machine learning component having been trained using simulated raw time-of-flight sensor data values computed using a computer graphics renderer which simulates multi-path interference.

4. The apparatus of claim 1 the trained machine learning component having been trained using simulated raw time-of-flight sensor data values comprising, for an individual pixel, weighted intensity values at different depths potentially depicted by the pixel.

5. The apparatus of claim 1 the trained machine learning component having been trained using simulated raw time-of-flight sensor data values where information about an exposure profile of the time-of-flight sensor is combined with the simulated raw time-of-flight sensor data values.

6. The apparatus of claim 1 the trained machine learning component having been trained using simulated raw time-of-flight sensor data values where information about sensor noise of the time-of-flight sensor is combined with the simulated raw time-of-flight sensor data values.

7. The apparatus of claim 1 the trained machine learning component having been trained using simulated raw time-of-flight sensor data values computed using a computer graphics renderer from a plurality of instances of a parametric 3D environment model, where the instances of the parametric 3D environment model are computer generated automatically at random.

8. The apparatus of claim 7 where parameters of the parametric 3D environment model comprise one or more of: geometry of an object in the 3D environment model, position of an object in the 3D environment model, presence of an object in the 3D environment model, orientation of an object in the 3D environment model, surface materials and reflectivity, ambient illumination.

9. The apparatus of claim 1 wherein a training data pair comprises a frame of simulated raw time-of-flight sensor data values and a corresponding simulated ground truth depth map.

10. The apparatus of claim 1, the trained machine learning component having been trained using simulated raw time-of-flight sensor data values computed using a computer graphics renderer for a plurality of randomly selected viewpoints of the time-of-flight sensor, and where any of the viewpoints which are within a threshold distance of a surface in a 3D environment model used by the computer graphics renderer are omitted.

11. The apparatus of claim 1 the trained machine learning component having been trained using simulated raw time-of-flight sensor data values aggregated over a neighborhood of a pixel, where the neighborhood is a spatial neighborhood, or a temporal neighborhood, or a spatial and temporal neighborhood.

12. The apparatus of claim 1 where the trained machine learning component is a pixel independent regressor.

13. The apparatus of claim 1 where the trained machine learning component is regressor which takes into account relationships between pixels of the stored time-of-flight sensor data.

14. The apparatus of claim 1 where the trained machine learning component is a convolutional neural network and where each training data pair comprises a frame of simulated raw time-of-flight sensor data and a ground truth depth map.

15. The apparatus of claim 1 where the trained machine learning component is at least partially implemented using hardware logic selected from any one or more of: a field-programmable gate array, an application-specific integrated circuit, an application-specific standard product, a system-on-a-chip, a complex programmable logic device, a graphics processing unit.

16. One or more computer-readable storage devices comprising computer-executable instructions that, when executed by one or more processors, cause the one or more processors to perform the following operations storing frames of raw time-of-flight sensor data received from a time-of-flight sensor; and operating a trained machine learning component having been trained using training data pairs, a training data pair comprising at least one simulated raw time-of-flight sensor data value and a corresponding simulated ground truth depth value;

wherein operating the trained machine learning component comprises computing, in a single stage, for an item of the stored raw time-of-flight sensor data, a depth value of a surface depicted by the item, by pushing the item through the trained machine learning component.

17. The one or more computer-readable storage device of claim 16 where operating the trained machine learning component further comprises operating the trained machine learning component in real time by computing the depth value at a rate which is equivalent to or faster than a frame rate of the time-of-flight sensor.

18. The one or more computer-readable storage device of claim 16 where the trained machine learning component comprises a convolutional neural network.

19. The one or more computer-readable storage device of claim 16 where the trained machine learning component comprises a pixel independent regressor which is a regressor that does not take into account relationships between pixels of a time-of-flight sensor frame.

20. A computer-implemented method comprising:

storing, at a memory, raw time-of-flight sensor data received from a time-of-flight sensor; and operating, by a processor, a trained machine learning component having been trained using training data pairs, a training data pair comprising at least one simulated raw time-of-flight sensor data value and a corresponding simulated ground truth depth value;

wherein operating the trained machine learning component comprises computing, in a single stage, for an item of the stored raw time-of-flight sensor data, a depth value of a surface depicted by the item, by pushing the item through the trained machine learning component.

* * * * *